United States Patent Office

2,804,439
Patented Aug. 27, 1957

2,804,439

ROSIN-VINYLSILANE ADDUCTS AND POLYMERS THEREOF

Erhart K. Drechsel, Springdale, Conn., assignor to American Cyanamid Company, New York, N. Y., a corporation of Maine No Drawing. Application November 10, 1953,
Serial No. 391,379

5 Claims. (Cl. 260—27)

The present invention relates to monomeric Diels-Alder adducts formed by reacting rosin with a monomeric hydrolyzable vinylsilane, and to the polymers formed by hydrolysis of these adducts.

The monomeric Diels-Alder adducts of the present invention have the theoretical formula $$R\begin{matrix}-CH\\ |\\ -CH-SiX_3\end{matrix}$$

wherein R= represents the combined rosin, and each of the X's represents a hydrolyzable substituent.

The polysiloxanes resulting from hydrolysis of these adducts contain the recurring linkage expressed by the theoretical formula $$\left[R\begin{matrix}-CH\\ |\\ -CH-\underset{|}{\overset{|}{Si}}-O-\\ \phantom{-CH-}O\\ \phantom{-CH-}|\end{matrix}\right]$$

wherein R= represents rosin as in the formula above.

The expression R= in the formulae above represents natural rosin including gum rosin and wood rosin, and any of the purified natural rosins including tall oil rosin.

These rosins are complex and not yet completely defined mixtures of rosin acids in which abietic acid predominates. The evidence is that abietic acid, during the heating necessary to form Diels-Alder adducts therefrom, is converted to laevopimaric acid. In the case of this acid, R= in the formulae above therefore represents

[structural formula of laevopimaric acid residue with H, COOH, CH(CH₃)₂, CH₂ substituents]

A large part of the remaining acids in the rosins, however, react with the vinylsilanes in a similar manner yielding corresponding Diels-Alder adducts.

The monomeric Diels-Alder adducts of the present invention, therefore, are complex mixtures which are best described by their method of preparation; that is, as the Diels-Alder adducts formed by reacting 1 mol of a rosin with about 1 mol of a hydrolyzable silane of the formula $CH_2=CH-SiX_3$, wherein the X's represent hydrolyzable substituents. It will be understood that the adducts, as prepared, may and usually do contain a minor amount of other materials, including unreacted rosin acids, the unsaponifiable matter normally present in rosin, and unreacted vinylsilane.

The polysiloxanes which are formed by mixing the adducts with water are complex polymers. These products are likewise best described in terms of their method of preparation; that is, as the polysiloxanes formed by hydrolysis of the Diels-Alder adducts referred to.

The monomeric adducts are amber, very viscous tacky liquids having no distinct melting point. When exposed to moisture, they hydrolyze with evolution of alcohol or chlorine if, respectively, alkoxy or chloro substituents are present therein.

The polysiloxanes obtained by hydrolysis of these adducts are dark, viscous, amorphous and waxy, which likewise have no distinct melting point.

In addition to affording water-repellent coatings, the adducts have the following advantages.

1. They contain a large amount of combined rosin. As a result, consumption of the normally more costly silicon component is minimized.

2. They are prepared by simple and direct reaction in ordinary chemical equipment at atmospheric pressure. The use of solvents or catalysts is not required.

The adducts are formed by heating rosin with a hydrolyzable vinylsilane under anhydrous conditions at about 175°–225° C. An inert mutual solvent for the reagents may be employed, but is not at all necessary. Good yields are obtained using a stoichiometrical proportion of the silane and virtually theoretical yields, based on the amount of rosin taken, result when an excess of 50% or more of the silane is employed. The reaction is normally substantially complete in about 2 to 3 hours, and further heating does no harm. Any unreacted vinylsilane may be stripped off and reused.

The polysiloxane is conveniently prepared by first dissolving the adduct alone or in admixture with unreacted vinylsilane in a non-reactive, anhydrous, water-insoluble, volatile solvent therefor, such as benzene, toluene, xylene, dioxane, carbon tetrachloride, petroleum ether, naphtha, chloroform, or dichloroethane. The solution is then poured into a convenient volume of water. An aqueous dispersion of the polysiloxane forms at once, and the solvent may be recovered by the use of a separatory funnel. In instances where the adduct contains chlorine, the water may advantageously contain a neutralizing agent for the hydrochloric acid formed. Ammonia is preferred as the neutralizing agent since it yields ammonium chloride, a volatile salt.

Alternatively, the polysiloxane may be formed by impregnating a dry material or coating a surface with an anhydrous solution of the adduct, removing excess liquid, and exposing the material to moist air, water or steam.

As reagent for reaction with the rosin, any hydrolyzable vinylsilane may be used; that is, any vinylsilane which reacts with water to form a compound containing the $$CH_2=CH_2-\underset{|}{\overset{|}{Si}}-O-$$

linkage, and a large number of these are known. Vinyltrichlorosilane is preferred since this material gives the most rapid and complete reaction. In its place there may be employed the vinyl alkoxy, aryloxy and amino silanes. In this group vinyltrimethoxysilane, $$CH_2=CH_2-Si(OCH_3)_3$$

and vinyltriethoxysilane are preferred since these materials are liquids which have desirable boiling points and incorporate no hydrolyzable chlorine into the adduct. Mixed vinylsilanes, including vinyldichloromethoxysilane, fall within the scope of the present invention. However, the precise hydrolyzable groups present in the silanes play no part in the present invention.

If desired, an adduct may be formed according to the present invention by first reacting vinyltrichlorosilane with rosin and then subjecting the resulting trichloro adduct to alcoholysis with, for example, anhydrous ethanol. The same adduct forms as is formed by reaction of vinyltriethoxysilane with rosin.

The Diels-Alder adducts of the present invention and the polysiloxanes therefrom are useful for imparting water-repellency to surfaces, including paper, textiles, ceramics, leather and wood.

Materials may be made water-repellent according to the present invention by treating them with anhydrous solutions of the adducts and exposing them to water or water vapor. Alternatively, the materials may be imprengated or coated with an aqueous dispersion of the polysiloxane at 5%–25% concentration and dried.

A thin coating of the polysiloxane is sufficient to make surfaces such as ceramics water-repellent. In the case of paper and textiles, where complete impregnation may take place, between about 1/10% and 10% of the polysiloxanes should be applied, based on the weight of the paper or textile. In either event, the water-repellent properties of the polysiloxanes are improved by heating the material to which they are applied at 250° C. or the maximum temperature to which the material can safely be exposed, whichever is lower, for durations up to about 1 hour.

The invention is further disclosed by the examples which follow. It will be understood that the examples merely illustrate specific embodiments of the invention and are not to be construed as limitations thereon.

*Example 1*

A mixture of 302 gm. (1 mol) of N-grade gum rosin and 161.5 g. (1 mol) of vinyltrichlorosilane is heated to 190°–200° C. and is maintained at that temperature for 2 hours in a reaction flask filter with stirrer, thermometer and reflux condenser. The reaction mixture is then heated to 215° C. to strip off unreacted vinyltrichlorosilane. 9 gm. of the latter is recovered, indicating conversion of 94.5% of the rosin to the Diels-Alder adduct.

The product is an amber, viscous tacky liquid soluble in benzene, toluene, xylene, petroleum ether, dioxane, and carbon tetrachloride.

A substantially complete reaction may be obtained by using a 50% excess of the silane and prolonging the reaction to 6 hours.

The product has the theoretical formula

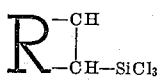

wherein R= represents the rosin molecule. It consists of this material plus unreacted rosin and other unreacted materials such as lignin and sterols.

*Example 2*

Water-repellent paper is produced as follows.

5 g. of the product of Example 1 is dissolved in 95 gm. of toluene. A sheet of bleached northern kraft paper is impregnated with the solution, and excess solution allowed to drain therefrom. The sheet is then dipped into concentrated ammonium hydroxide. Hydrolysis of the adduct to a polysiloxane takes place, and on air-drying a neutral water-repellent sheet is obtained. The water-repellency is improved by heating the sheet at 200° F. for 1 hour.

*Example 3*

Cotton broadcloth is treated in the same manner as the paper of Example 2. A water-repellent cloth is likewise obtained.

*Example 4*

Alcoholysis of the trichloro adduct of Example 1 into the corresponding triethoxy adduct is illustrated by the following.

100 gm. of the adduct of Example 1 is heated to 100° C. in the apparatus described, and 70 gm. of ethanol (a large excess over the stoichiometric amount required) is added slowly through the reflux condenser. Copious fumes of HCl evolve. The mixture is refluxed for 1 hour and distilled to strip off the unreacted alcohol. The product is a soft, dark, tacky wax having the theoretical formula

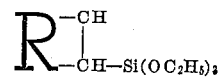

*Example 5*

The product of Example 4 is applied to paper as follows:

5 g. of the material is dissolved in 95 gm. of xylene and bleached northern kraft paper is passed through the solution. The paper is allowed to drain and is air-dried at 250° F. for 1 hour. Hydrolysis of the adduct to a polysiloxane takes place with development of a neutral water-repellent sheet.

*Example 6*

The preparation of water-repellent titanium dioxide of good pigmentary properties is illustrated by the following:

400 gm. of untreated, hydroclassified titanium dioxide particles of pigmentary size are slurried with 2.25 liters of water at 50° C. and 2 gm. of $ZnSO_4 \cdot H_2O$ stirred in. Sodium silicate equivalent to 0.25% of the weight of the titanium dioxide is then added followed by 40 gm. of $Al_2(SO_4)_3 \cdot 18H_2O$. The mixture is stirred for 30 minutes and the pH raised to 7.8 by addition of aqueous NaOH.

The pigment is filtered and washed until free of water-soluble salts. The pigment is reslurried in 1200 gm. of water.

A polysiloxane emulsion is formed by adding 40 gm. of a 50% benzene solution of the adduct of Example 1 to 400 gm. of water. Sufficient ammonium hydroxide is added to neutralize the adduct formed, and the benzene layer is removed by the use of a separatory funnel. The resulting emulsion is added with slow stirring to the pigment slurry.

After 1 hour of slow stirring the pigment is recovered by filtration, washed, dried at 55° C. and 20 mm. Hg pressure, and heated for 3 hours at 150° C. During this heating ammonium chloride volatilizes from the pigment. The pigment is water-repellent when tested by pasting with water, and may be used in lithographic inks and water emulsion paints.

I claim:

1. The Diels-Alder adduct of rosin with a compound of the formula $CH_2=CH-SiX_3$, wherein the X's represent hydrolyzable substituents.

2. The Diels-Alder adduct of rosin with vinyltrichlorosilane.

3. The Diels-Alder adduct of rosin with vinyltrimethoxysilane.

4. The Diels-Alder adduct of rosin with vinyltriethoxysilane.

5. A polysiloxane formed by hydrolyzing the Diels-Alder adduct of rosin with a compound of the formula $CH_2=CH-SiX_3$, wherein the X's represent hydrolyzable substituents.

References Cited in the file of this patent

UNITED STATES PATENTS

| 2,426,121 | Rust et al. | Aug. 19, 1947 |
| 2,468,770 | Morris et al. | May 3, 1949 |
| 2,477,654 | Rummelsburg | Aug. 2, 1949 |
| 2,532,583 | Tyran | Dec. 5, 1950 |

OTHER REFERENCES

Wagner et al.: Ind. and Eng. Chem., February 1953, volume 45, No. 2, pages 367 thru 373.